US012807267B2

(12) United States Patent
Iwatsuki et al.

(10) Patent No.: US 12,807,267 B2
(45) Date of Patent: Nov. 24, 2026

(54) VEHICLE BRAKE SYSTEM

(71) Applicant: Robert Bosch GmbH, Stuttgart (DE)

(72) Inventors: Junya Iwatsuki, Kanagawa (JP); Shoichiro Kanekom, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 321 days.

(21) Appl. No.: 18/706,537

(22) PCT Filed: Oct. 27, 2022

(86) PCT No.: PCT/IB2022/060337
§ 371 (c)(1),
(2) Date: May 1, 2024

(87) PCT Pub. No.: WO2023/089421
PCT Pub. Date: May 25, 2023

(65) Prior Publication Data

US 2025/0010939 A1 Jan. 9, 2025

(30) Foreign Application Priority Data

Nov. 17, 2021 (JP) ................................ 2021-187318

(51) Int. Cl.
*B62L 3/02* (2006.01)
*B60T 8/17* (2006.01)
(Continued)

(52) U.S. Cl.
CPC ............ *B62L 3/023* (2013.01); *B60T 8/1706* (2013.01); *B60T 8/171* (2013.01); *B60T 8/172* (2013.01);
(Continued)

(58) Field of Classification Search
CPC .. B62L 3/023; B62L 1/005; B62L 3/04; B62L 3/08; B60T 8/1706; B60T 8/171;
(Continued)

(56) References Cited

U.S. PATENT DOCUMENTS

2007/0228818 A1* 10/2007 Tsuchida ............... B60T 8/4081 303/10
2010/0045097 A1 2/2010 Atsushi et al.
2012/0200148 A1 8/2012 Waida et al.

FOREIGN PATENT DOCUMENTS

EP 1839978 A1 * 10/2007 ............ B60T 8/1706
EP 2311701 A1 4/2011
(Continued)

OTHER PUBLICATIONS

Machine translation of IDS cited JP 2015182685A, pp. 1-14 (Year: 2026).*
(Continued)

*Primary Examiner* — Tisha D Lewis

(74) *Attorney, Agent, or Firm* — Michael Best & Friedrich LLP

(57) ABSTRACT

A vehicle brake system for a vehicle, the vehicle brake system capable of suppressing a cost increase. The brake system includes a hydraulic pressure control unit that controls a braking force generated by the vehicle brake system, a first master chamber that is a master chamber for a front wheel and at least communicates with a wheel cylinder of the front wheel, and a second master chamber that is a master chamber for a rear wheel and at least communicates with a wheel cylinder of the rear wheel. The hydraulic pressure control unit controls a braking force generated on one wheel of the front wheel and the rear wheel, and the first master chamber and the second master chamber are connected to the hydraulic pressure control unit.

10 Claims, 6 Drawing Sheets

(51) Int. Cl.
*B60T 8/171* (2006.01)
*B60T 8/172* (2006.01)
*B60T 8/1761* (2006.01)

(52) U.S. Cl.
CPC ....... *B60T 8/17616* (2013.01); *B60T 2240/03* (2013.01)

(58) Field of Classification Search
CPC .. B60T 8/172; B60T 8/17616; B60T 2240/03; B60T 8/261; B60T 8/3225; B60T 13/145; B60T 13/662; B60T 13/686
See application file for complete search history.

(56) References Cited

FOREIGN PATENT DOCUMENTS

| | | |
|---|---|---|
| JP | 2015182685 A | 10/2015 |
| JP | 2018008674 A | 1/2018 |

OTHER PUBLICATIONS

International Search Report and Written Opinion for Application No. PCT/IB2022/060337 dated Jan. 25, 2023 (8 pages).

* cited by examiner

[FIG. 1]
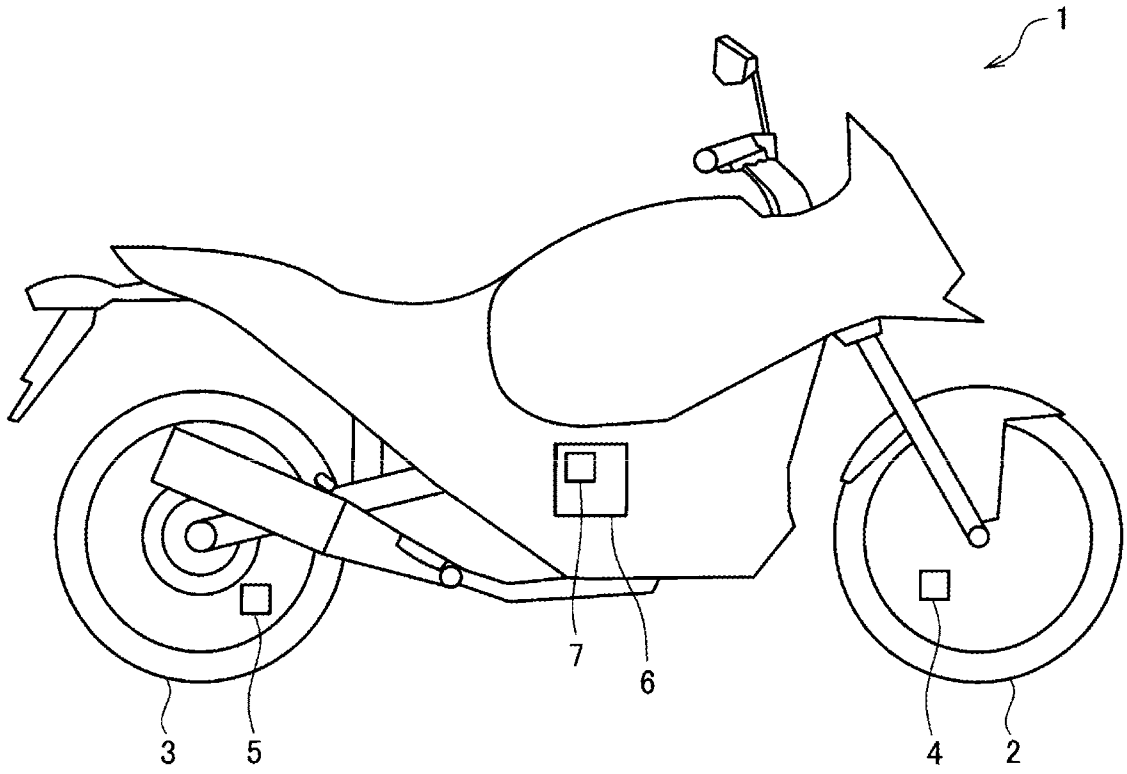

[FIG. 2]
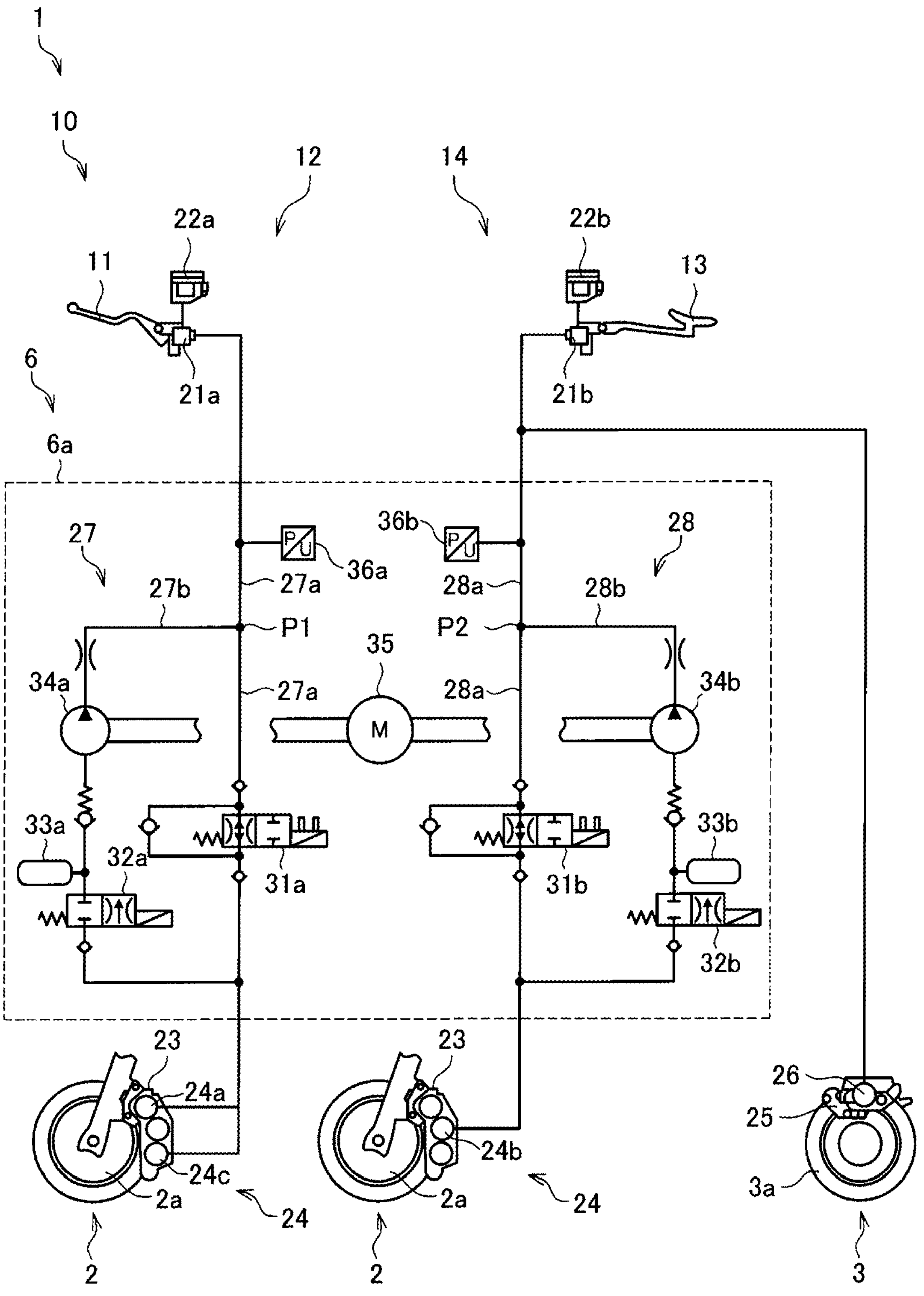

[FIG. 3]
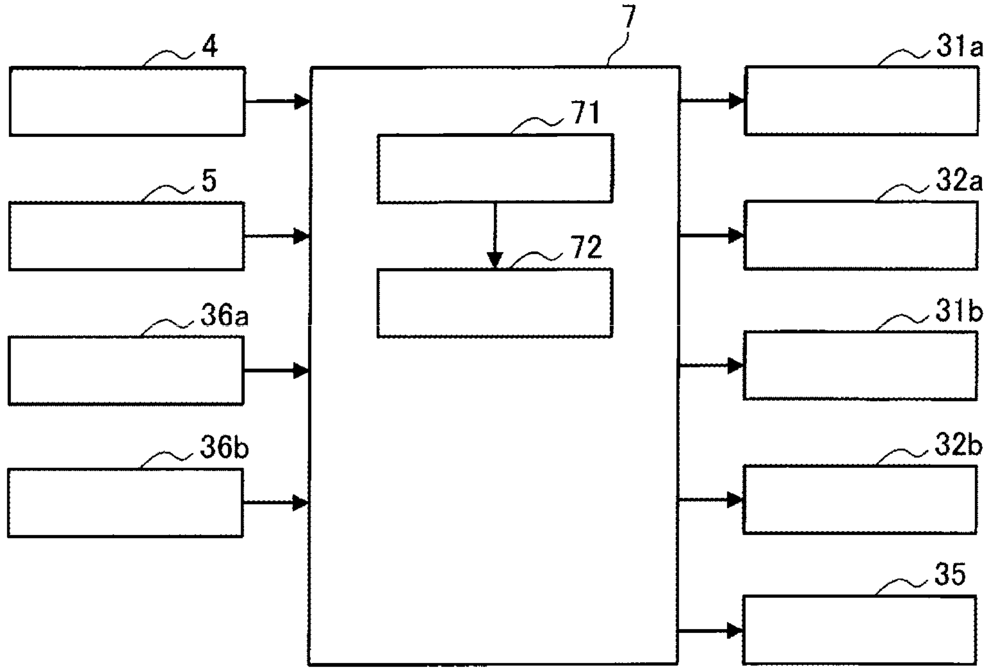
[FIG. 4]
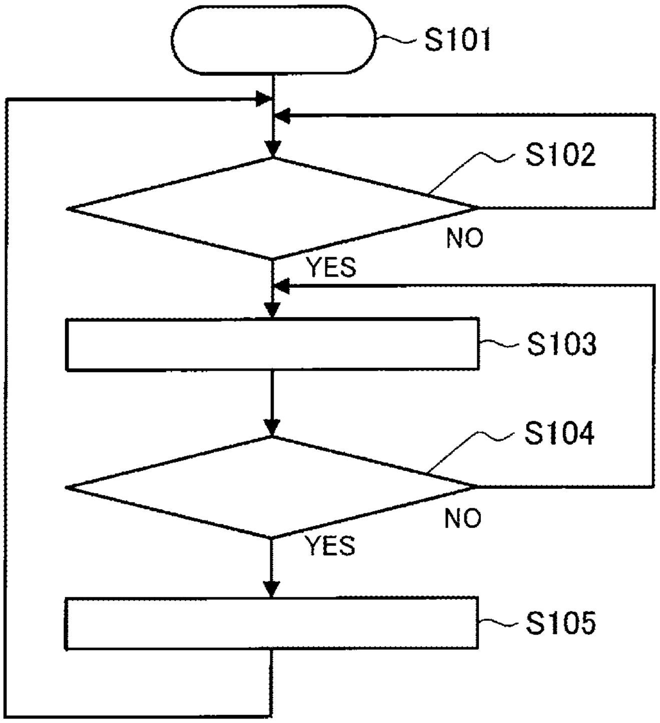

[FIG. 5]
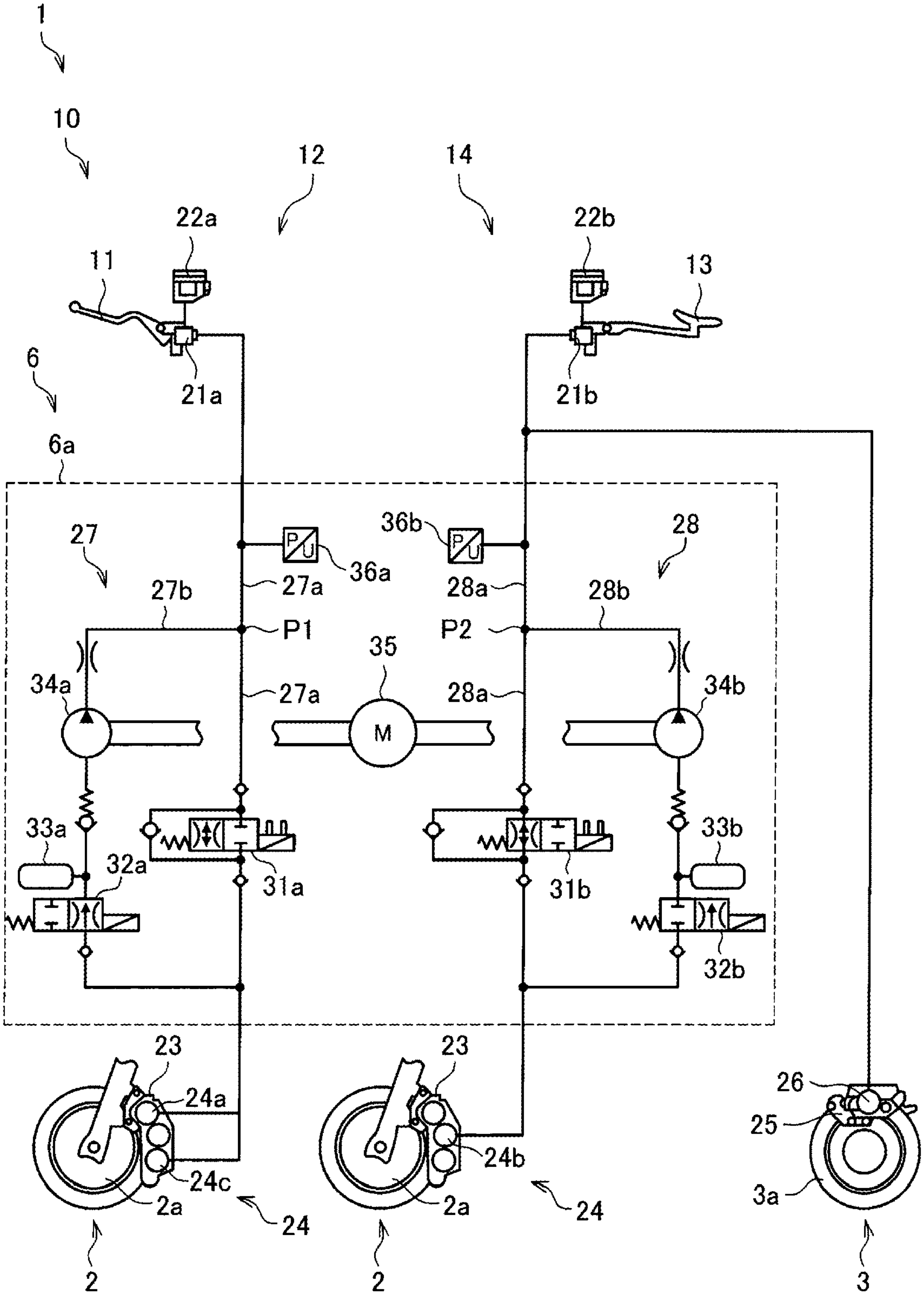

[FIG. 6]
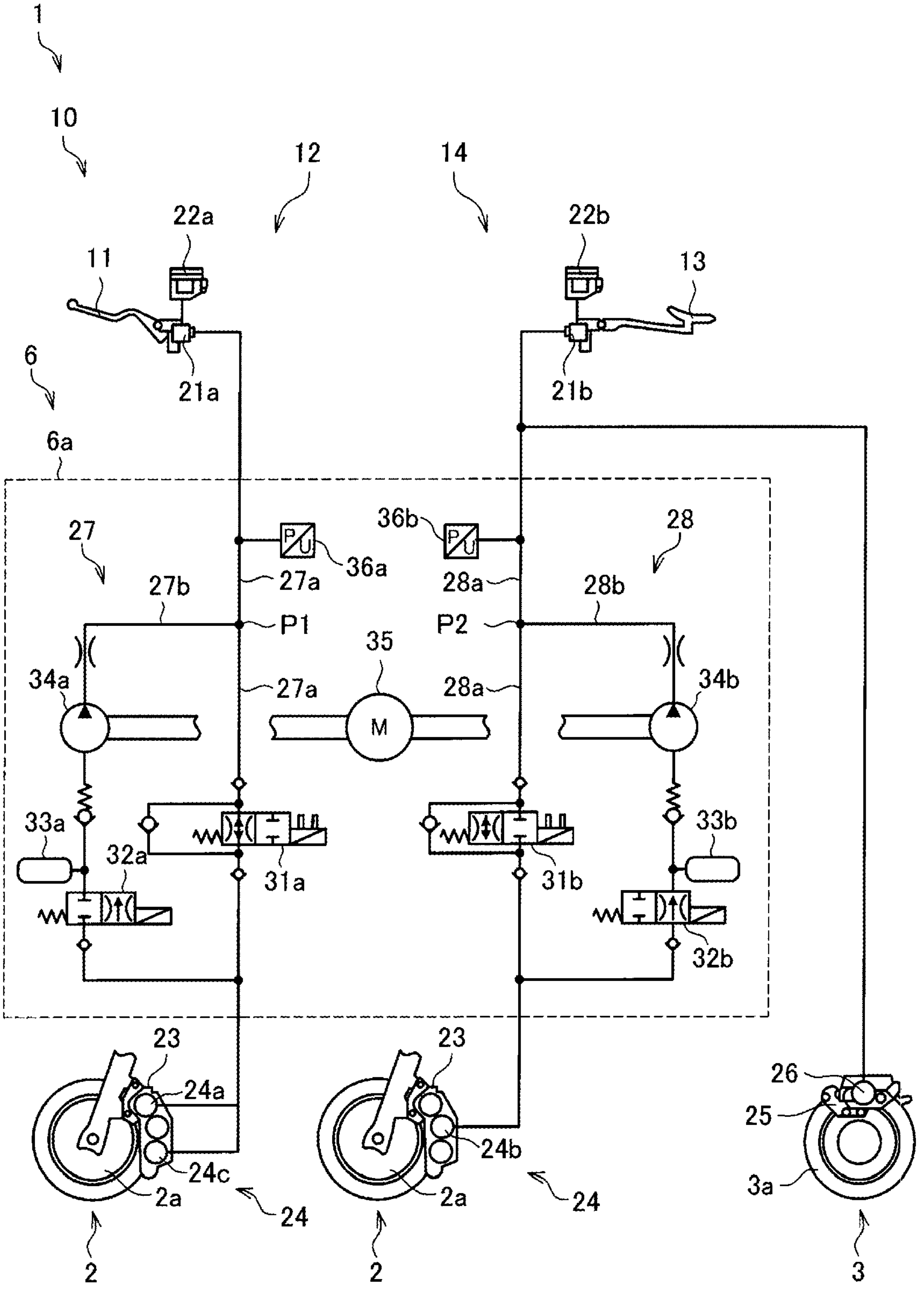

[FIG. 7]
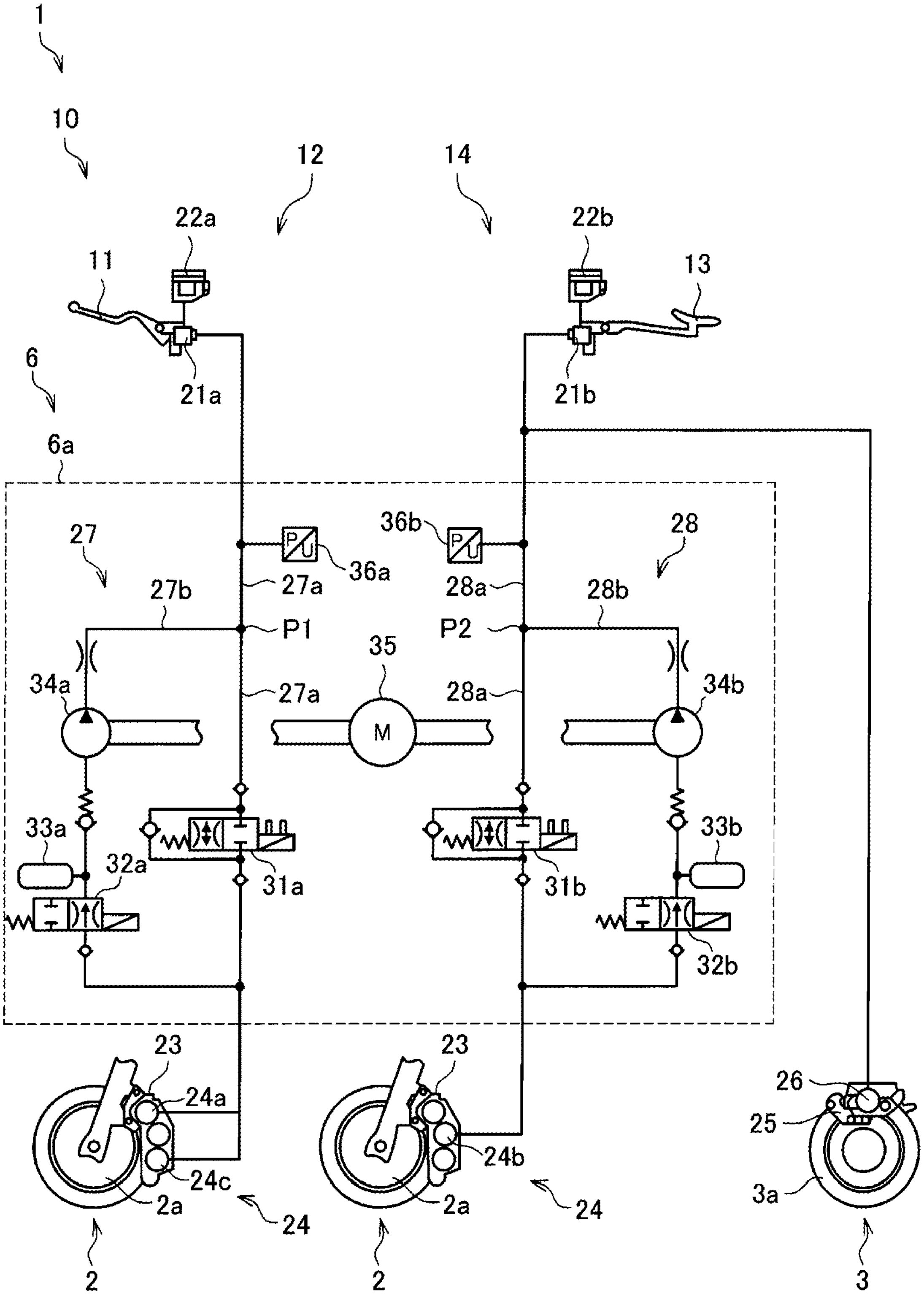

VEHICLE BRAKE SYSTEM

BACKGROUND

This disclosure relates to a vehicle brake system capable of suppressing a cost increase.

Conventionally, a vehicle such as a motorcycle is provided with a hydraulic pressure control unit for controlling a braking force that is generated on a wheel. In a vehicle brake system that includes the hydraulic pressure control unit, a master chamber of a master cylinder or the like and a wheel cylinder communicate with each other via the hydraulic pressure control unit. Then, when operation of a component, such as a valve, that is provided to the hydraulic pressure control unit is controlled, a pressure of a brake fluid in the wheel cylinder is controlled (for example, see JP-A-2018-8674).

By the way, there is a case where one of a master chamber for a front wheel and a master chamber for a rear wheel communicates with both of a wheel cylinder for the front wheel and a wheel cylinder for the rear wheel. For example, there is a case where, in the motorcycle, the plural wheel cylinders for the front wheel exist, the master cylinder for the front wheel communicates with a part of the wheel cylinders for the front wheel, and the master cylinder for the rear wheel communicates with both of a part of the other wheel cylinders for the front wheel and the wheel cylinder for the rear wheel. It is considered to provide the hydraulic pressure control unit to such a vehicle, so as to be able to separately control a braking force generated on the front wheel and a braking force generated on the rear wheel. However, in such a case, cost is possibly increased due to an increase in the number of components in the hydraulic pressure control unit, or the like.

SUMMARY

The present invention has been made with the above-described problem as the background and therefore obtains a vehicle brake system capable of suppressing a cost increase.

A vehicle brake system according to the present invention is a vehicle brake system that includes: a hydraulic pressure control unit that controls a braking force generated to a vehicle; a first master chamber that is a master chamber for a front wheel and at least communicates with a wheel cylinder of the front wheel of the vehicle; and a second master chamber that is a master chamber for a rear wheel and at least communicates with a wheel cylinder of the rear wheel of the vehicle. The hydraulic pressure control unit controls a braking force that is generated on one wheel of the front wheel and the rear wheel, the first master chamber and the second master chamber are connected to the hydraulic pressure control unit, and, of the first master chamber and the second master chamber, the master chamber for the other of the front wheel and the rear wheel is connected to the wheel cylinder of the other wheel without the hydraulic pressure control unit being interposed therebetween.

The vehicle brake system according to the present invention is the vehicle brake system that includes: the hydraulic pressure control unit that controls the braking force generated to the vehicle; the first master chamber that is the master chamber for the front wheel and at least communicates with the wheel cylinder of the front wheel of the vehicle; and the second master chamber that is the master chamber for the rear wheel and at least communicates with the wheel cylinder of the rear wheel of the vehicle. The hydraulic pressure control unit controls the braking force that is generated on the one wheel of the front wheel and the rear wheel, the first master chamber and the second master chamber are connected to the hydraulic pressure control unit, and, of the first master chamber and the second master chamber, the master chamber for the other of the front wheel and the rear wheel is connected to the wheel cylinder of the other wheel without the hydraulic pressure control unit being interposed therebetween. In this way, compared to a case where the braking force generated on the front wheel and the braking force generated on the rear wheel can separately be controlled, it is possible to suppress an increase in the number of components of the hydraulic pressure control unit, and the like. Therefore, it is possible to suppress a cost increase.

BRIEF DESCRIPTION OF DRAWINGS

FIG. 1 is a schematic view illustrating an outline configuration of a vehicle according to an embodiment of the present invention.

FIG. 2 is a schematic view illustrating an outline configuration of a vehicle brake system according to the embodiment of the present invention.

FIG. 3 is a block diagram illustrating an exemplary functional configuration of a controller according to the embodiment of the present invention.

FIG. 4 is a flowchart illustrating an example of a processing procedure that is executed by the controller according to the embodiment of the present invention.

FIG. 5 is a schematic view illustrating the vehicle brake system according to the embodiment of the present invention in the case where, of first wheel cylinder depressurization control and second wheel cylinder depressurization control, only the first wheel cylinder depressurization control is executed.

FIG. 6 is a schematic view illustrating the vehicle brake system according to the embodiment of the present invention in the case where, of the first wheel cylinder depressurization control and the second wheel cylinder depressurization control, only the second wheel cylinder depressurization control is executed.

FIG. 7 is a schematic view illustrating the vehicle brake system according to the embodiment of the present invention in the case where both of the first wheel cylinder depressurization control and the second wheel cylinder depressurization control are executed.

DETAILED DESCRIPTION

A description will hereinafter be made on a vehicle brake system according to the present invention with reference to the drawings.

A description will hereinafter be made on the vehicle brake system that is mounted to a two-wheeled motorcycle (see a vehicle 1 in FIG. 1). However, a vehicle, to which the vehicle brake system according to the present invention is mounted, may be a vehicle other than the two-wheeled motorcycle (for example, another straddle-type vehicle such as an all-terrain vehicle, a three-wheeled motorcycle, or a pedal-driven vehicle, a four-wheeled automobile, or the like). The straddle-type vehicle means a vehicle that a rider straddles. Examples of the straddle-type vehicle are motorcycles (a two-wheeled motor vehicle and a three-wheeled motor vehicle), the pedal-driven vehicle, and the all-terrain vehicle. The motorcycles include a vehicle having an engine as a power source, a vehicle having an electric motor as a power source, and the like. Examples of the motorcycles are a motorbike, a scooter, and an electric scooter. The pedal-driven vehicle means a vehicle capable of traveling forward on a road by a depression force applied to pedals by the rider. Examples of the pedal-driven vehicle are a normal pedal-driven vehicle, an electrically-assisted pedal-driven vehicle, and an electric pedal-driven vehicle.

A configuration, operation, and the like, which will be described below, merely constitute one example. The vehicle brake system according to the present invention is not limited to a case with such a configuration, such operation, and the like.

The same or similar description will appropriately be simplified or will not be made below. In the drawings, the same or similar members or portions will not be denoted by a reference sign or will be denoted by the same reference sign. A detailed structure will appropriately be illustrated in a simplified manner or will not be illustrated.

<Configuration of Vehicle>

A description will be made on a configuration of the vehicle 1 according to an embodiment of the present invention with reference to FIG. 1 to FIG. 3.

FIG. 1 is a schematic view illustrating an outline configuration of the vehicle 1. FIG. 2 is a schematic view illustrating an outline configuration of a vehicle brake system 10. FIG. 3 is a block diagram illustrating an exemplary functional configuration of a controller 7.

The vehicle 1 is a two-wheeled motorcycle that corresponds to an example of the vehicle according to the present invention. As illustrated in FIG. 1, the vehicle 1 includes a front wheel 2, a rear wheel 3, a front-wheel rotational frequency sensor 4, a rear-wheel rotational frequency sensor 5, and a hydraulic pressure control unit 6, and the controller (ECU) 7.

The front-wheel rotational frequency sensor 4 is a wheel rotational frequency sensor that detects a rotational frequency of the front wheel 2 (for example, a rotational frequency of the front wheel 2 per unit time [rpm], a travel distance of the front wheel 2 per unit time [km/h], or the like), and outputs a detection result. The front-wheel rotational frequency sensor 4 may detect another physical quantity that can substantially be converted to the rotational frequency of the front wheel 2. The front-wheel rotational frequency sensor 4 is provided to the front wheel 2.

The rear-wheel rotational frequency sensor 5 is a wheel rotational frequency sensor that detects a rotational frequency of the rear wheel 3 (for example, the rotational frequency of the rear wheel 3 per unit time [rpm], a travel distance of the rear wheel 3 per unit time [km/h], or the like), and outputs a detection result. The rear-wheel rotational frequency sensor 5 may detect another physical quantity that can substantially be converted to the rotational frequency of the rear wheel 3. The rear-wheel rotational frequency sensor 5 is provided to the rear wheel 3.

The hydraulic pressure control unit 6 is a unit that has a function of controlling a braking force generated to the vehicle 1. For example, the hydraulic pressure control unit 6 includes components (for example, a control valve and a pump) that are provided on an oil channel connecting a master cylinder and a wheel cylinder and that control a pressure of a brake fluid in the wheel cylinder. When operation of the components in the hydraulic pressure control unit 6 is controlled, the braking force generated on the wheel is controlled. A detailed description on the vehicle brake system 10 that includes the hydraulic pressure control unit 6 will be made below.

The controller 7 controls operation of the hydraulic pressure control unit 6. For example, the controller 7 is partially or entirely constructed of a microcomputer, a microprocessor unit, or the like. In addition, the controller 7 may partially or entirely be constructed of one whose firmware and the like can be updated, or may partially or entirely be a program module or the like that is executed by a command from a CPU or the like, for example. The controller 7 may be provided as one unit or may be divided into plural units, for example. In the example illustrated in FIG. 1, the controller 7 is included in the hydraulic pressure control unit 6. However, the controller 7 may not be included in the hydraulic pressure control unit 6. A detailed description on the functional configuration of the controller 7 will be made below.

Here, a detailed description will be made on the vehicle brake system 10 of the vehicle 1 with reference to FIG. 2. As illustrated in FIG. 2, the vehicle brake system 10 includes: a first brake operation section 11; a front-wheel brake mechanism 12 that brakes at least the front wheel 2 in an interlocking manner with at least the first brake operation section 11; a second brake operation section 13; and a rear-wheel brake mechanism 14 that brakes at least the rear wheel 3 in an interlocking manner with at least the second brake operation section 13. Of the front wheel 2 and the rear wheel 3, the front-wheel brake mechanism 12 only brakes the front wheel 2. The rear-wheel brake mechanism 14 brakes both of the front wheel 2 and the rear wheel 3.

The vehicle brake system 10 also includes the hydraulic pressure control unit 6, and the front-wheel brake mechanism 12 and the rear-wheel brake mechanism 14 are partially included in the hydraulic pressure control unit 6. The hydraulic pressure control unit 6 is a unit that has a function of controlling the braking force applied to the front wheel 2 by the front-wheel brake mechanism 12 and the braking force applied to the front wheel 2 by the rear-wheel brake mechanism 14. Just as described, the hydraulic pressure control unit 6 controls the braking force that is generated on the front wheel 2 as one wheel of the front wheel 2 and the rear wheel 3.

A description will hereinafter be made on an example in which, of the front wheel 2 and the rear wheel 3, the hydraulic pressure control unit 6 controls the braking force generated on the front wheel 2. However, as will be described below, of the front wheel 2 and the rear wheel 3, the hydraulic pressure control unit 6 may control the braking force generated on the rear wheel 3. In this case, the front-wheel brake mechanism 12 brakes both of the front wheel 2 and the rear wheel 3, and the rear-wheel brake mechanism 14 brakes only the rear wheel 3 of the front wheel 2 and the rear wheel 3.

The first brake operation section 11 is provided to a handlebar of the vehicle 1 and is operated by the rider's hand, for example. The first brake operation section 11 is a brake lever, for example. The second brake operation section 13 is provided to a lower portion of a trunk of the vehicle 1 and is operated by the rider's foot, for example. The second brake operation section 13 is a brake pedal, for example. However, like a brake operation section of the scooter or the like, each of the first brake operation section 11 and the second brake operation section 13 may be the brake lever that is operated by the rider's hand.

A first master cylinder 21*a* is attached to the first brake operation section 11. A first reservoir 22*a* is attached to the first master cylinder 21*a*. A second master cylinder 21*b* is attached to the second brake operation section 13. A second reservoir 22*b* is attached to the second master cylinder 21*b*.

The front wheel 2 is provided with a brake caliper 23 that is held by the trunk of the vehicle 1 and has a brake pad (not illustrated). The brake caliper 23 is provided with wheel cylinders 24*a*, 24*b*, 24*c* as wheel cylinders 24 of the front wheel 2. Of the wheel cylinders 24*a*, 24*b*, 24*c*, the wheel cylinders 24*a*, 24*c* will also be referred to as first wheel cylinders 24*a*, 24*c*. Of the wheel cylinders 24*a*, 24*b*, 24*c*, the wheel cylinder 24*b* will also be referred to as a second wheel cylinder 24*b*.

The wheel cylinders 24*a*, 24*b*, 24*c* of the front wheel 2 are aligned in this order at spaced intervals in a circumferential direction of the front wheel 2, for example. Thus, the second wheel cylinder 24*b* is arranged between the first wheel cylinders 24*a*, 24*c*. Thus, the second wheel cylinder 24*b* is arranged between the first wheel cylinders 24*a*, 24*c*. However, a positional relationship among the first wheel cylinders and the second wheel cylinder is not limited to this example. In addition, the number of the first wheel cylinders and the number of the second wheel cylinder are not limited to this example. For example, the number of the first wheel cylinders may be one, three, or more. The number of the second wheel cylinders may be two or more. The number of the first wheel cylinders may be larger than, may be the same as, or may be smaller than the number of the second wheel cylinders.

The rear wheel 3 is provided with a brake caliper 25 that is held by the trunk of the vehicle 1 and has a brake pad (not illustrated). The brake caliper 25 is provided with a wheel cylinder 26 of the rear wheel 3.

The first master cylinder 21*a* corresponds to an example of a first master chamber as a master chamber for the front wheel 2 that communicates with at least the wheel cylinders 24 of the front wheel 2. The second master cylinder 21*b* corresponds to an example of a second master chamber as a master chamber for the rear wheel 3 that communicates with at least the wheel cylinder 26 of the rear wheel 3. The first master cylinder 21*a* and the second master cylinder 21*b* are connected to the hydraulic pressure control unit 6. The hydraulic pressure control unit 6 is connected to the first wheel cylinders 24*a*, 24*c* and the second wheel cylinder 24*b* as the wheel cylinders 24 of the front wheel 2.

Here, the hydraulic pressure control unit 6 is provided with: a first channel 27 that communicates between the first master cylinder 21*a* and each of the first wheel cylinders 24*a*, 24*c*; and a second channel 28 that communicates between the second master cylinder 21*b* and the second wheel cylinder 24*b*. Thus, the first master cylinder 21*a* is connected to the first wheel cylinders 24*a*, 24*c* of the wheel cylinders 24 of the front wheel 2 via the hydraulic pressure control unit 6. Meanwhile, the second master cylinder 21*b* is connected to the second wheel cylinder 24*b* of the wheel cylinders 24 of the front wheel 2 via the hydraulic pressure control unit 6.

Of the first master cylinder 21*a* and the second master cylinder 21*b*, the second master cylinder 21*b*, which corresponds to the master chamber for the rear wheel 3, is connected to the wheel cylinder 26 of the rear wheel 3 without the hydraulic pressure control unit 6 being interposed therebetween. More specifically, the second master cylinder 21*b* is connected to the wheel cylinder 26 of the rear wheel 3 without at least a base body 6*a*, which will be described below, of the hydraulic pressure control unit 6 being interposed therebetween. In the example illustrated in FIG. 2, a brake fluid channel that is connected to the second master cylinder 21*b* is branched, and branched channels are then connected to the hydraulic pressure control unit 6 and the wheel cylinder 26, respectively. However, the channel that connects the second master cylinder 21*b* and the hydraulic pressure control unit 6 and the channel that connects the second master cylinder 21*b* and the wheel cylinder 26 may separately be connected to the second master cylinder 21*b*.

The front-wheel brake mechanism 12 includes the first brake operation section 11, the first master cylinder 21*a*, the first reservoir 22*a*, the brake caliper 23 of the front wheel 2, the first wheel cylinders 24*a*, 24*c* of the wheel cylinders 24 of the front wheel 2, and the first channel 27. The first channel 27 includes a first primary channel 27*a* and a first secondary channel 27*b*.

The first primary channel 27*a* communicates between the first master cylinder 21*a* and each of the first wheel cylinders 24*a*, 24*c*. The first primary channel 27*a* is provided with a first inlet valve 31*a*. The first secondary channel 27*b* releases the brake fluid in each of the first wheel cylinders 24*a*, 24*c* to an intermediate portion P1 of the first primary channel 27*a*. The first secondary channel 27*b* bypasses a portion of the first primary channel 27*a* between the first wheel cylinders 24*a*, 24*c* side and the first master cylinder 21*a* side of the first inlet valve 31*a*. The first secondary channel 27*b* is sequentially provided with a first outlet valve 32*a*, a first accumulator 33*a*, and a first pump 34*a* from an upstream side.

The rear-wheel brake mechanism 14 includes the second brake operation section 13, the second master cylinder 21*b*, the second reservoir 22*b*, the brake caliper 23 of the front wheel 2, the second wheel cylinder 24*b* of the wheel cylinders 24 of the front wheel 2, the brake caliper 25 of the rear wheel 3, the wheel cylinder 26 of the rear wheel 3, and the second channel 28. The second channel 28 includes a second primary channel 28*a* and a second secondary channel 28*b*.

The second primary channel 28*a* communicates between the second master cylinder 21*b* and the second wheel cylinder 24*b*. The second primary channel 28*a* is provided with a second inlet valve 31*b*. The second secondary channel 28*b* releases the brake fluid in the second wheel cylinder 24*b* to an intermediate portion P2 of the second primary channel 28*a*. The second secondary channel 28*b* bypasses a portion of the second primary channel 28*a* between the second wheel cylinder 24*b* side and the second master cylinder 21*b* side of the second inlet valve 31*b*. The second secondary channel 28*b* is sequentially provided with a second outlet valve 32*b*, a second accumulator 33*b*, and a second pump 34*b* from the upstream side.

The first inlet valve 31*a* and the second inlet valve 31*b* are electromagnetic valves, each of which is opened in an unenergized state and closed in an energized state, for example. The first outlet valve 32*a* and the second outlet valve 32*b* are electromagnetic valves, each of which is closed in the unenergized state and opened in the energized state, for example.

The hydraulic pressure control unit 6 is provided with a common drive source 35 that drives both of the first pump 34*a* and the second pump 34*b*. The drive source 35 is an electric motor, for example. Operation of the drive source 35 is controlled by the controller 7.

The hydraulic pressure control unit 6 is provided with a first master cylinder pressure sensor 36*a* and a second master cylinder pressure sensor 36*b*. However, the hydraulic pressure control unit 6 may not be provided with the first master cylinder pressure sensor 36*a* and the second master cylinder pressure sensor 36*b*.

The first master cylinder pressure sensor 36*a* detects a first master cylinder pressure that is a pressure of the brake fluid in the first master cylinder 21*a*, and outputs a detection result. The first master cylinder pressure sensor 36*a* may detect another physical quantity that can substantially be converted to the first master cylinder pressure.

The second master cylinder pressure sensor 36*b* detects a second master cylinder pressure that is a pressure of the brake fluid in the second master cylinder 21*b*, and outputs a detection result. The second master cylinder pressure sensor 36*b* may detect another physical quantity that can substantially be converted to the second master cylinder pressure.

The hydraulic pressure control unit 6 includes: components such as the first inlet valve 31*a*, the first outlet valve 32*a*, the first accumulator 33*a*, the first pump 34*a*, the second inlet valve 31*b*, the second outlet valve 32*b*, the second accumulator 33*b*, the second pump 34*b*, and the drive source 35 used to control the pressure of the brake fluid; and the base body 6*a* that is provided with those components and is formed with channels constituting the first channel 27 and the second channel 28 therein.

The base body 6*a* may be formed of one member or may be formed of plural members. In addition, in the case where the base body 6*a* is formed of the plural members, the components may separately be provided to the different members.

The controller 7 controls operation of the above components of the hydraulic pressure control unit 6. As a result, the braking force generated on the front wheel 2 and the braking force generated on the rear wheel 3 are controlled.

During normal time (that is, when the braking force that corresponds to a brake operation by the rider is set to be generated on the wheel), the controller 7 opens the first inlet valve 31*a* and the second inlet valve 31*b* and closes the first outlet valve 32*a* and the second outlet valve 32*b*. When the first brake operation section 11 is operated in such a state, in the front-wheel brake mechanism 12, a piston (not illustrated) in the first master cylinder 21*a* is pressed to increase the pressure of the brake fluid in each of the first wheel cylinders 24*a*, 24*c* of the front wheel 2, the brake pad (not illustrated) of the brake caliper 23 of the front wheel 2 is then pressed against a rotor 2*a* of the front wheel 2, and the braking force is thereby generated on the front wheel 2.

Meanwhile, when the second brake operation section 13 is operated, in the rear-wheel brake mechanism 14, a piston (not illustrated) in the second master cylinder 21*b* is pressed to increase the pressure of the brake fluid in the wheel cylinder 26 of the rear wheel 3, the brake pad (not illustrated) of the brake caliper 25 of the rear wheel 3 is then pressed against a rotor 3*a* of the rear wheel 3, and the braking force is thereby generated on the rear wheel 3. In addition, when the second brake operation section 13 is operated, in the rear-wheel brake mechanism 14, the piston (not illustrated) in the second master cylinder 21*b* is pressed to increase the pressure of the brake fluid in the second wheel cylinder 24*b* of the front wheel 2, too, the brake pad (not illustrated) of the brake caliper 23 of the front wheel 2 is then pressed against the rotor 2*a* of the front wheel 2, and the braking force is also thereby generated on the front wheel 2.

A detailed description will hereinafter be made on the functional configuration of the controller 7 with reference to FIG. 3. As illustrated in FIG. 3, the controller 7 includes an acquisition section 71 and an execution section 72, for example. In addition, the controller 7 communicates with each of the devices in the vehicle 1.

The acquisition section 71 acquires information from each of the devices in the vehicle 1, and outputs the acquired information to the execution section 72. For example, the acquisition section 71 acquires the information from the front-wheel rotational frequency sensor 4, the rear-wheel rotational frequency sensor 5, the first master cylinder pressure sensor 36*a*, and the second master cylinder pressure sensor 36*b*. In the present specification, the acquisition of the information can include extraction, generation, and the like of the information.

The execution section 72 controls the operation of each of the components of the hydraulic pressure control unit 6. For example, the execution section 72 controls the operation of the first inlet valve 31*a*, the first outlet valve 32*a*, the second inlet valve 31*b*, the second outlet valve 32*b*, and the drive source 35.

As described above, during the normal time, the execution section 72 controls the operation of each of the components in the hydraulic pressure control unit 6 such that the braking force corresponding to the brake operation by the rider is generated on the wheel. Meanwhile, in a particular case, the execution section 72 executes anti-lock brake control. In the anti-lock brake control, the braking force of the wheel is adjusted to such a braking force with which locking of the wheel can be avoided. The operation of the vehicle brake system 10 in the anti-lock brake control will be described below.

<Operation of Vehicle Brake System>

A description will be made on the operation of the vehicle brake system 10 according to the embodiment of the present invention with reference to FIG. 4 to FIG. 7.

As described above, the execution section 72 of the controller 7 can execute the anti-lock brake control. A description will hereinafter be made on processing that is related to the anti-lock brake control executed by the controller 7 with reference to a flowchart in FIG. 4, and the like.

FIG. 4 is a flowchart illustrating an example of a processing procedure that is executed by the controller 7. Step S101 in FIG. 4 corresponds to initiation of the control flow illustrated in FIG. 4. When the control flow illustrated in FIG. 4 is initiated, the anti-lock brake control is not executed.

When the control flow illustrated in FIG. 4 is initiated, in step S102, the execution section 72 determines whether a slip or a possible slip of the front wheel 2 is detected. The execution section 72 can detect the slip or the possible slip of the front wheel 2 by using the detection results of the front-wheel rotational frequency sensor 4 and the rear-wheel rotational frequency sensor 5, for example.

For example, the execution section 72 acquires a speed of the vehicle 1 on the basis of the detection results of the front-wheel rotational frequency sensor 4 and the rear-wheel rotational frequency sensor 5. Then, in the case where a slip rate of the front wheel 2 exceeds a target slip rate, the execution section 72 determines the front wheel 2 slips or possibly slips. That is, this case corresponds to a case where the slip or the possible slip of the front wheel 2 is detected. The slip rate is an index that indicates a degree of slippage of the wheel on a road surface, and is a value that is acquired by dividing a difference between the vehicle speed and the wheel rotational frequency by the vehicle speed.

If it is determined that the slip or the possible slip of the front wheel 2 is not detected (step S102/NO), step S102 is repeated. On the other hand, if it is determined that the slip or the possible slip of the front wheel 2 is detected (step S102/YES), the processing proceeds to step S103. In step S103, the execution section 72 executes the anti-lock brake control.

In the anti-lock brake control, depressurization control is executed. In the depressurization control, the pressure of the brake fluid in the wheel cylinder 24 of the front wheel 2 is reduced by controlling the operation of each of the components of the hydraulic pressure control unit 6. As a result, the braking force of the front wheel 2 is adjusted to such a braking force with which locking thereof can be avoided. In detail, in the anti-lock brake control, the depressurization control, hydraulic pressure keeping control for keeping the pressure of the brake fluid in the wheel cylinder 24 of the front wheel 2, and pressurization control for increasing the pressure of the brake fluid in the wheel cylinder 24 of the front wheel 2 are repeatedly executed in this order. A detailed description on the depressurization control in the anti-lock brake control will be made below.

After step S103, in step S104, the execution section 72 determines whether a termination condition of the anti-lock brake control is satisfied. The termination condition of the anti-lock brake control only needs to be a condition capable of determining that locking of the front wheel 2 is avoided, and any of the various conditions can be used.

If it is determined that the termination condition of the anti-lock brake control is not satisfied (step S104/NO), the processing returns to step S103. On the other hand, if it is determined that the termination condition of the anti-lock brake control is satisfied (step S104/YES), the processing proceeds to step S105. In step S105, the execution section 72 terminates the anti-lock brake control, and the processing returns to step S102.

As described above, in the anti-lock brake control, the controller 7 executes the depressurization control for reducing the pressure of the brake fluid in the wheel cylinder 24 of the front wheel 2. In the vehicle brake system 10, in the case where the slip or the possible slip of the front wheel 2 is detected, the controller 7 executes, as the depressurization control, at least one of first wheel cylinder depressurization control and second wheel cylinder depressurization control.

FIG. 5 is a schematic view illustrating the vehicle brake system 10 in the case where, of the first wheel cylinder depressurization control and the second wheel cylinder depressurization control, only the first wheel cylinder depressurization control is executed.

As illustrated in FIG. 5, in the first wheel cylinder depressurization control, the controller 7 brings the first inlet valve 31*a* into a closed state and brings the first outlet valve 32*a* into an open state. Then, in this state, the controller 7 drives the drive source 35. In this way, the first pump 34*a* is driven, and the pressure of the brake fluid in each of the first wheel cylinders 24*a*, 24*c* is reduced. As a result, the braking force generated on the front wheel 2 is reduced. In the first wheel cylinder depressurization control, the brake fluid that has flowed into the first accumulator 33*a* from each of the first wheel cylinders 24*a*, 24*c* is returned to the first primary channel 27*a* via the first secondary channel 27*b* by the first pump 34*a*.

As described above, the first wheel cylinder depressurization control is the depressurization control to bring the first inlet valve 31*a* into the closed state and brings the first outlet valve 32*a* into the open state. The first wheel cylinder depressurization control is executed in conjunction with driving of the drive source 35. Initiation timing of driving of the drive source 35 may be before, may match, or may be after timing of bringing the first inlet valve 31*a* into the closed state and bringing the first outlet valve 32*a* into the open state.

FIG. 6 is a schematic view illustrating the vehicle brake system 10 in the case where only the second wheel cylinder depressurization control of the first wheel cylinder depressurization control and the second wheel cylinder depressurization control is executed.

As illustrated in FIG. 6, in the second wheel cylinder depressurization control, the controller 7 brings the second inlet valve 31*b* into the closed state and brings the second outlet valve 32*b* into the open state. Then, in this state, the controller 7 drives the drive source 35. In this way, the second pump 34*b* is driven, and the pressure of the brake fluid in the second wheel cylinder 24*b* is reduced. As a result, the braking force generated on the front wheel 2 is reduced. In the second wheel cylinder depressurization control, the brake fluid that has flowed into the second accumulator 33*b* from the second wheel cylinder 24*b* is returned to the second primary channel 28*a* via the second secondary channel 28*b* by the second pump 34*b*.

As described above, the second wheel cylinder depressurization control is the depressurization control to bring the second inlet valve 31*b* into the closed state and bring the second outlet valve 32*b* into the open state. The second wheel cylinder depressurization control is executed in conjunction with driving of the drive source 35. The initiation timing of driving of the drive source 35 may be before, may match, or may be after timing of bringing the second inlet valve 31*b* into the closed state and bringing the second outlet valve 32*b* into the open state.

FIG. 7 is a schematic view illustrating the vehicle brake system 10 in the case where both of the first wheel cylinder depressurization control and the second wheel cylinder depressurization control are executed.

As illustrated in FIG. 7, in the case where the slip or the possible slip of the front wheel 2 is detected, the controller 7 may execute both of the first wheel cylinder depressurization control and the second wheel cylinder depressurization control in conjunction with driving of the drive source 35. In this case, both of the pressure of the brake fluid in each of the first wheel cylinders 24*a*, 24*c* and the pressure of the brake fluid in the second wheel cylinder 24*b* are reduced.

The controller 7 can determine whether to execute the first wheel cylinder depressurization control and the second wheel cylinder depressurization control by various methods. A description will hereinafter be made on various examples related to the determination on whether to execute the first wheel cylinder depressurization control and the second wheel cylinder depressurization control.

In the case where the slip or the possible slip of the front wheel 2 is detected, the controller 7 may execute, in conjunction with driving of the drive source 35, both of the first wheel cylinder depressurization control and the second wheel cylinder depressurization control not on the basis of the operation states of the first brake operation section 11 and the second brake operation section 13.

Here, the controller 7 can acquire the operation state of the first brake operation section 11 by using the detection result of the first master cylinder pressure sensor 36*a*, and can acquire the operation state of the second brake operation section 13 by using the detection result of the second master cylinder pressure sensor 36*b*. For example, the operation state of each of the brake operation sections can include a state such as a magnitude of an operation amount of the respective brake operation section, in addition to whether the respective brake operation section is operated.

However, in the case where the first master cylinder pressure sensor 36*a* and the second master cylinder pressure sensor 36*b* are not provided, or the like, the controller 7 may not be able to acquire the operation states of the first brake operation section 11 and the second brake operation section 13. In such a case, it is difficult to determine the brake operation of which of the brake operation sections causes the slip or the possible slip of the front wheel 2. Thus, when both of the first wheel cylinder depressurization control and the second wheel cylinder depressurization control are executed, locking of the front wheel 2 can appropriately be avoided.

In addition, the controller 7 may determine whether to execute the first wheel cylinder depressurization control and the second wheel cylinder depressurization control on the basis of the operation states of the first brake operation section 11 and the second brake operation section 13.

More specifically, in the case where the brake operation using the first brake operation section 11 is prioritized over the brake operation using the second brake operation section 13, the controller 7 may permit the first wheel cylinder depressurization control and prohibit the second wheel cylinder depressurization control. For example, in the case where the brake operation using the second brake operation section 13 is not performed, and only the brake operation using the first brake operation section 11 is performed, the controller 7 may permit the first wheel cylinder depressurization control and prohibit the second wheel cylinder depressurization control. In addition, for example, in the case where the operation amount of the first brake operation section 11 is larger than the operation amount of the second brake operation section 13, the controller 7 may permit the first wheel cylinder depressurization control and prohibit the second wheel cylinder depressurization control.

On the other hand, in the case where the brake operation using the second brake operation section 13 is prioritized over the brake operation using the first brake operation section 11, the controller 7 may permit the second wheel cylinder depressurization control and prohibit the first wheel cylinder depressurization control. For example, in the case where the brake operation using the first brake operation section 11 is not performed, and only the brake operation using the second brake operation section 13 is performed, the controller 7 may permit the second wheel cylinder depressurization control and prohibit the first wheel cylinder depressurization control. In addition, for example, in the case where the operation amount of the second brake operation section 13 is larger than the operation amount of the first brake operation section 11, the controller 7 may permit the second wheel cylinder depressurization control and prohibit the first wheel cylinder depressurization control.

In the case where whether to execute the first wheel cylinder depressurization control and the second wheel cylinder depressurization control is determined as described above, and the front wheel 2 slips or possibly slips due to the brake operation using the first brake operation section 11, locking of the front wheel 2 can be avoided only by the first wheel cylinder depressurization control. Meanwhile, in the case where the front wheel 2 slips or possibly slips due to the brake operation using the second brake operation section 13, locking of the front wheel 2 can be avoided only by the second wheel cylinder depressurization control. In this way, unnecessary execution of both of the first wheel cylinder depressurization control and the second wheel cylinder depressurization control is suppressed, and thus worsening of the rider's comfort, which is caused by vibration generated to the brake operation section due to the depressurization control, or the like, is suppressed.

The controller 7 may determine whether to execute the first wheel cylinder depressurization control and the second wheel cylinder depressurization control on the basis of the information other than the operation states of the first brake operation section 11 and the second brake operation section 13. For example, the controller 7 may determine whether to execute the first wheel cylinder depressurization control and the second wheel cylinder depressurization control on the basis of a comparison result between the braking force (more specifically, an estimated value) applied to the front wheel 2 by the first wheel cylinders **24*a*, 24*c* and the braking force (more specifically, an estimated value) applied to the front wheel 2 by the second wheel cylinder 24*b*. In this case, for example, in the case where the braking force applied to the front wheel 2 by the first wheel cylinders 24*a*, 24*c* is larger than the braking force applied to the front wheel 2 by the second wheel cylinder 24*b*, the controller 7 may permit the first wheel cylinder depressurization control and prohibit the second wheel cylinder depressurization control. On the other hand, in the case where the braking force applied to the front wheel 2 by the second wheel cylinder 24*b* is larger than the braking force applied to the front wheel 2 by the first wheel cylinders 24*a*, 24*c*, the controller 7** may permit the second wheel cylinder depressurization control and prohibit the first wheel cylinder depressurization control.

In addition, the controller 7 may determine the execution of which one of the first wheel cylinder depressurization control and the second wheel cylinder depressurization control is prioritized on the basis of a magnitude relationship between the number of the first wheel cylinders **24*a*, 24*c* and the number of the second wheel cylinder 24*b*. In the above example, the number of the first wheel cylinders 24*a*, 24*c* is two, and the number of the second wheel cylinder 24*b* is one. Thus, the number of the first wheel cylinders 24*a*, 24*c* is larger than the number of the second wheel cylinder 24*b***.

Just as described, in the case where the number of the first wheel cylinders **24*a*, 24*c* is larger than the number of the second wheel cylinder 24*b*, the controller 7 may prioritize the execution of the first wheel cylinder depressurization control over the execution of the second wheel cylinder depressurization control. For example, in the case where the slip or the possible slip of the front wheel 2 is detected, the controller 7 first executes the first wheel cylinder depressurization control. Then, only when it is difficult to avoid locking of the front wheel 2 only by the first wheel cylinder depressurization control, the controller 7** executes the second wheel cylinder depressurization control in addition to the first wheel cylinder depressurization control.

Here, as the number of the wheel cylinders is increased, a magnitude of the braking force that can be generated is increased. Accordingly, when the determination is made on the execution of which one of the first wheel cylinder depressurization control and the second wheel cylinder depressurization control is prioritized, such a situation can arise where locking of the front wheel 2 can be avoided by only one of the first wheel cylinder depressurization control and the second wheel cylinder depressurization control. As a result, the unnecessary execution of both of the first wheel cylinder depressurization control and the second wheel cylinder depressurization control is suppressed, and thus worsening of the rider's comfort, which is caused by the vibration generated to the brake operation section due to the depressurization control, or the like, is suppressed.

As the example of the case where the execution of the first wheel cylinder depressurization control is prioritized over the execution of the second wheel cylinder depressurization control, the above description has been made on the example in which the controller 7 executes the first wheel cylinder depressurization control earlier than the second wheel cylinder depressurization control. However, the control in which the execution of the first wheel cylinder depressurization control is prioritized over the execution of the second wheel cylinder depressurization control is not limited to this example. For example, in the case where the execution of the first wheel cylinder depressurization control is prioritized over the execution of the second wheel cylinder depressurization control, the controller 7 may increase a reduced amount of the pressure of the brake fluid in each of the first wheel cylinders 24*a*, 24*c* by the first wheel cylinder depressurization control to be larger than a reduced amount of the pressure of the brake fluid in the second wheel cylinder 24*b* by the second wheel cylinder depressurization control.

Here, unlike the above example, in the case where the number of the second wheel cylinders is larger than the number of the first wheel cylinders, the controller 7 may prioritize the execution of the second wheel cylinder depressurization control over the execution of the first wheel cylinder depressurization control.

The above description has been made on the example in which the hydraulic pressure control unit 6 controls the braking force generated on the front wheel 2, which is the one wheel of the front wheel 2 and the rear wheel 3. However, of the front wheel 2 and the rear wheel 3, the hydraulic pressure control unit 6 may control the braking force generated on the rear wheel 3. In this case, the plural wheel cylinders 26 are provided to the rear wheel 3. Similar to the above example, the first master cylinder 21*a* and the second master cylinder 21*b* are connected to the hydraulic pressure control unit 6. The hydraulic control unit 6 is connected to the plural wheel cylinders 26 of the rear wheel 3. Then, of the first master cylinder 21*a* and the second master cylinder 21*b*, the first master cylinder 21*a* that corresponds to the master chamber for the front wheel 2 is connected to the wheel cylinders 24 of the front wheel 2 without the hydraulic pressure control unit 6 being interposed therebetween. For this reason, the front-wheel brake mechanism 12, which includes the first master cylinder 21*a*, brakes both of the front wheel 2 and the rear wheel 3, and the rear-wheel brake mechanism 14, which includes the second master cylinder 21*b*, only brakes the rear wheel 3 of the front wheel 2 and the rear wheel 3.

The above description has been made on the exemplary configurations of the first channel 27 and the second channel 28 of the hydraulic pressure control unit 6 with reference to FIG. 2 and the like. However, the configurations of the first channel 27 and the second channel 28 are not limited to those in the above example. For example, the first channel 27 may further include a supply channel through which the brake fluid in the first master cylinder 21*a* is supplied to a portion of the first secondary channel 27*b* between the first outlet valve 32*a* and the first pump 34*a*. In addition, the second channel 28 may further include a supply channel through which the brake fluid in the second master cylinder 21*b* is supplied to a portion of the second secondary channel 28*b* between the second outlet valve 32*b* and the second pump 34*b*.

<Effects of Vehicle Brake System>

A description will be made on effects of the vehicle brake system 10 according to the embodiment of the present invention.

The vehicle brake system 10 includes: the hydraulic pressure control unit 6 that controls the braking force generated to the vehicle 1; the first master cylinder 21*a* that corresponds to the first master chamber as the master chamber for the front wheel 2 and at least communicates with the wheel cylinders 24 of the front wheel 2 of the vehicle 1; and the second master cylinder 21*b* that corresponds to the second master chamber as the master chamber for the rear wheel 3 and at least communicates with the wheel cylinder 26 of the rear wheel 3 of the vehicle 1. In the vehicle brake system 10, the hydraulic pressure control unit 6 controls the braking force generated on the front wheel 2, which is the one wheel of the front wheel 2 and the rear wheel 3, the first master cylinder 21*a* and the second master cylinder 21*b* are connected to the hydraulic pressure control unit 6, and, of the first master cylinder 21*a* and the second master cylinder 21*b*, the second master cylinder 21*b*, which corresponds to the master chamber for the rear wheel 3 as the other of the front wheel 2 and the rear wheel 3, is connected to the wheel cylinder 26 of the rear wheel 3 as the other wheel without the hydraulic pressure control unit 6 being interposed therebetween.

In this way, compared to the case where the braking force generated on the front wheel 2 and the braking force generated on the rear wheel 3 can separately be controlled, it is possible to suppress the increase in the number of the components of the hydraulic pressure control unit 6, and the like. For example, in the case where the braking force generated on the front wheel 2 and the braking force generated on the rear wheel 3 can separately be controlled, the hydraulic pressure control unit 6 is provided with the components for reducing the pressure of the brake fluid in the wheel cylinder 26 of the rear wheel 3, which is the other vehicle described above. On the other hand, such components are unnecessary in this embodiment. Therefore, it is possible to suppress a cost increase.

However, as described above, the one wheel described above may be the rear wheel 3, and the other wheel described above may be the front wheel 2. Also, in such a case, the same effect as above is exerted.

Preferably, in the vehicle brake system 10, the hydraulic pressure control unit 6 is connected to the first wheel cylinders 24*a*, 24*c* and the second wheel cylinder 24*b* as the wheel cylinders 24 of the front wheel 2 corresponding to the one wheel, and the hydraulic pressure control unit 6 is provided with: the first channel 27 that communicates between the first master cylinder 21*a* corresponding to the first master chamber and each of the first wheel cylinders 24*a*, 24*c*; the first pump 34*a* that is provided to the first channel 27; the second channel 28 that communicates between the second master cylinder 21*b* corresponding to the second master chamber and the second wheel cylinder 24*b*; the second pump 34*b* that is provided to the second channel 28; and the common drive source 35, the operation of which is controlled by the controller 7, and that drives both of the first pump 34*a* and the second pump 34*b*. Accordingly, by driving the common drive source 35, the brake fluid can be delivered by each of the pumps in both of the first channel 27 and the second channel 28. Therefore, it is possible to control the pressure of the brake fluid in each of the first wheel cylinders 24*a*, 24*c* and the second wheel cylinder 24*b* by using the common drive source 35.

Preferably, in the vehicle brake system 10, the first channel 27 includes: the first primary channel 27*a* that communicates between the first master cylinder 21*a* as the first master chamber and each of the first wheel cylinders 24*a*, 24*c* and is provided with the first inlet valve 31*a*; and the first secondary channel 27*b*, through which the brake fluid in each of the first wheel cylinders 24*a*, 24*c* is released to the intermediate portion P1 of the first primary channel 27*a*, and that is provided with the first outlet valve 32*a*, and the second channel 28 includes: the second primary channel 28*a* that communicates between the second master cylinder 21*b* corresponding to the second master chamber and the second wheel cylinder 24*b* and is provided with the second inlet valve 31*b*; and the second secondary channel 28*b*, through which the brake fluid in the second wheel cylinder

24*b* is released to the intermediate portion P2 of the second primary channel 28*a*, and that is provided with the second outlet valve 32*b*. In this way, it is possible to execute the depressurization control, which reduces the pressure of the brake fluid, for both of the first wheel cylinders 24*a*, 24*c* and the second wheel cylinder 24*b*.

Preferably, in the vehicle brake system 10, in the case where the slip or the possible slip of the front wheel 2 as the one wheel described above is detected, the controller 7 executes, in conjunction with driving of the drive source 35, at least one of the first wheel cylinder depressurization control for bringing the first inlet valve 31*a* into the closed state and bringing the first outlet valve 32*a* into the open state and the second wheel cylinder depressurization control for bringing the second inlet valve 31*b* into the closed state and bringing the second outlet valve 32*b* into the open state. In this way, it is possible to reduce the pressure of the brake fluid in each of the wheel cylinders 24 of the front wheel 2. Therefore, it is possible to reduce the braking force generated on the front wheel 2 and thus can avoid locking of the front wheel 2.

Preferably, the vehicle brake system 10 includes: the first brake operation section 11 that is attached to the first master cylinder 21*a* corresponding to the first master chamber; and the second brake operation section 13 that is attached to the second master cylinder 21*b* corresponding to the second master chamber, and the controller 7 executes, in conjunction with driving of the drive source 35, both of the first wheel cylinder depressurization control and the second wheel cylinder depressurization control not on the basis of the operation states of the first brake operation section 11 and the second brake operation section 13 in the case where the slip or the possible slip of the front wheel 2 as the one wheel described above is detected. In this way, also, in the case where the first master cylinder pressure sensor 36*a* and the second master cylinder pressure sensor 36*b* are not provided, or the like, it is possible to appropriately avoid locking of the front wheel 2.

Preferably, the vehicle brake system 10 includes: the first brake operation section 11 that is attached to the first master cylinder 21*a* corresponding to the first master chamber; and the second brake operation section 13 that is attached to the second master cylinder 21*b* corresponding to the second master chamber, and the controller 7 determines whether to execute the first wheel cylinder depressurization control and the second wheel cylinder depressurization control on the basis of the operation states of the first brake operation section 11 and the second brake operation section 13. As a result, the unnecessary execution of both of the first wheel cylinder depressurization control and the second wheel cylinder depressurization control is suppressed, and thus worsening of the rider's comfort, which is caused by the vibration generated to the brake operation section due to the depressurization control, or the like, is suppressed.

Preferably, in the vehicle brake system 10, in the case where the brake operation using the first brake operation section 11 is prioritized over the brake operation using the second brake operation section 13, the controller 7 permits the first wheel cylinder depressurization control and prohibits the second wheel cylinder depressurization control, and in the case where the brake operation using the second brake operation section 13 is prioritized over the brake operation using the first brake operation section 11, the controller 7 permits the second wheel cylinder depressurization control and prohibits the first wheel cylinder depressurization control. In this way, the unnecessary execution of both of the first wheel cylinder depressurization control and the second wheel cylinder depressurization control is further appropriately suppressed, and thus worsening of the rider's comfort, which is caused by the vibration generated to the brake operation section due to the depressurization control, or the like, is further appropriately suppressed.

Preferably, in the vehicle brake system 10, the controller 7 determines the execution of which one of the first wheel cylinder depressurization control and the second wheel cylinder depressurization control is prioritized on the basis of the magnitude relationship between the number of the first wheel cylinders 24*a*, 24*c* and the number of the second wheel cylinder 24*b*. As a result, such a situation can arise where locking of the front wheel 2 can be avoided by only one of the first wheel cylinder depressurization control and the second wheel cylinder depressurization control. Therefore, the unnecessary execution of both of the first wheel cylinder depressurization control and the second wheel cylinder depressurization control is suppressed, and thus worsening of the rider's comfort, which is caused by the vibration generated to the brake operation section due to the depressurization control, or the like, is suppressed.

Preferably, in the vehicle brake system 10, the vehicle 1 is the motorcycle. In this way, it is possible to suppress the cost increase of the vehicle brake system 10 that is mounted to the motorcycle. Furthermore, in the motorcycle compared to a four-wheeled automobile and the like, a mounting space for the hydraulic pressure control unit 6 is limited. Accordingly, a degree of freedom in arrangement of the hydraulic pressure control unit 6 is improved by simplifying the configuration of the hydraulic pressure control unit 6 and thus downsizing the hydraulic pressure control unit 6.

Preferably, in the case where the vehicle 1 is the motorcycle, the one wheel described above is the front wheel 2. In the motorcycle, the braking force generated on the front wheel 2 is basically larger than the braking force generated on the rear wheel 3. Thus, necessity of avoiding locking of the front wheel 2 is high. Therefore, when the hydraulic pressure control unit 6 controls the braking force generated on the front wheel 2, behavior of the motorcycle can be stabilized.

The present invention is not limited to the embodiment that has been described. For example, only a part of the embodiment may be implemented.

REFERENCE SIGNS LIST

1: Vehicle
2: Front wheel
2*a*: Rotor
3: Rear wheel
3*a*: Rotor
4: Front-wheel rotational frequency sensor
5: Rear-wheel rotational frequency sensor
6: Hydraulic pressure control unit
6*a*: Base body
7: Controller
10: Vehicle brake system
11: First brake operation section
12: Front-wheel brake mechanism
13: Second brake operation section
14: Rear-wheel brake mechanism
21*a*: First master cylinder
21*b*: Second master cylinder
22*a*: First reservoir
22*b*: Second reservoir
23: Brake caliper
24: Wheel cylinder

24*a*: First wheel cylinder
24*b*: Second wheel cylinder
24*c*: First wheel cylinder
25: Brake caliper
26: Wheel cylinder
27: First channel
27*a*: First primary channel
27*b*: First secondary channel
28: Second channel
28*a*: Second primary channel
28*b*: Second secondary channel
31*a*: First inlet valve
31*b*: Second inlet valve
32*a*: First outlet valve
32*b*: Second outlet valve
33*a*: First accumulator
33*b*: Second accumulator
34*a*: First pump
34*b*: Second pump
35: Drive source
36*a*: First master cylinder pressure sensor
36*b*: Second master cylinder pressure sensor
71: Acquisition section
72: Execution section
P1: Intermediate portion
P2: Intermediate portion

The invention claimed is:

1. A vehicle brake system (10) for a vehicle (1), the brake system (10) comprising:
- a hydraulic pressure control unit (6) that controls a braking force generated by the vehicle brake system;
- a first master chamber (21*a*) that is a master chamber for a front wheel (2) and at least communicates with a wheel cylinder (24) of the front wheel (2); and
- a second master chamber (21*b*) that is a master chamber for a rear wheel (3) and at least communicates with a wheel cylinder (26) of the rear wheel (3), wherein
- the hydraulic pressure control unit (6) controls a braking force generated on one wheel (2) of the front wheel (2) and the rear wheel (3),
- the first master chamber (21*a*) and the second master chamber (21*b*) are connected to the hydraulic pressure control unit (6),
- of the first master chamber (21*a*) and the second master chamber (21*b*), the master chamber for the other wheel (3) of the front wheel (2) and the rear wheel (3) is connected to the wheel cylinder (26) of the other wheel (3) without the hydraulic pressure control unit (6) being interposed therebetween, and
- the wheel cylinder (26) of the other wheel (3) is independent from a flow path passing through the hydraulic pressure control unit (6).

2. The vehicle brake system according to claim 1, wherein
- the hydraulic pressure control unit (6) is connected to a first wheel cylinder (24*a*, 24*c*) and a second wheel cylinder (24*b*) as the wheel cylinders (24) of the one wheel (2), and
- the hydraulic pressure control unit (6) is provided with: a first channel (27) that communicates between the first master chamber (21*a*) and the first wheel cylinder (24*a*, 24*c*); a first pump (34*a*) that is provided to the first channel (27); a second channel (28) that communicates between the second master chamber (21*b*) and the second wheel cylinder (24*b*); a second pump (34*b*) that is provided to the second channel (28); and a common drive source (35), operation of which is controlled by a controller (7) and that drives both of the first pump (34*a*) and the second pump (34*b*).

3. The vehicle brake system according to claim 2, wherein
- the first channel (27) includes: a first primary channel (27*a*) that communicates between the first master chamber (21*a*) and the first wheel cylinder (24*a*, 24*c*) and is provided with a first inlet valve (31*a*); and a first secondary channel (27*b*), through which a brake fluid in the first wheel cylinder (24*a*, 24*c*) is released to an intermediate portion (P1) of the first primary channel (27*a*), and that is provided with a first outlet valve (32*a*), and
- the second channel (28) includes: a second primary channel (28*a*) that communicates between the second master chamber (21*b*) and the second wheel cylinder (24*b*) and is provided with a second inlet valve (31*b*); and a second secondary channel (28*b*), through which a brake fluid in the second wheel cylinder (24*b*) is released to an intermediate portion (P2) of the second primary channel (28*a*), and that is provided with a second outlet valve (32*b*).

4. The vehicle brake system according to claim 3, wherein
- in the case where a slip or a possible slip of the one wheel (2) is detected, the controller (7) executes, in conjunction with driving of the drive source (35), at least one of first wheel cylinder depressurization control for bringing the first inlet valve (31*a*) into a closed state and bringing the first outlet valve (32*a*) into an open state and second wheel cylinder depressurization control for bringing the second inlet valve (31*b*) into a closed state and bringing the second outlet valve (32*b*) into an open state.

5. The vehicle brake system according to claim 4, wherein
- the vehicle brake system (10) includes: a first brake operation section (11) that is attached to the first master chamber (21*a*); and a second brake operation section (13) that is attached to the second master chamber (21*b*), and
- in the case where the slip or the possible slip of the one wheel (2) is detected, the controller (7) executes, in conjunction with driving of the drive source (35), both of the first wheel cylinder depressurization control and the second wheel cylinder depressurization control not based on operation states of the first brake operation section (11) and the second brake operation section (13).

6. The vehicle brake system according to claim 4, wherein
- the vehicle brake system (10) includes: a first brake operation section (11) that is attached to the first master chamber (21*a*); and a second brake operation section (13) that is attached to the second master chamber (21*b*), and
- the controller (7) determines whether to execute the first wheel cylinder depressurization control and the second wheel cylinder depressurization control based on operation states of the first brake operation section (11) and the second brake operation section (13).

7. The vehicle brake system according to claim 6, wherein the controller (7)
- permits the first wheel cylinder depressurization control and prohibits the second wheel cylinder depressurization control in the case where a brake operation using the first brake operation section (11) is prioritized over a brake operation using the second brake operation section (13), and
- permits the second wheel cylinder depressurization control and prohibits the first wheel cylinder depressurization control in the case where the brake operation using the second brake operation section (13) is prioritized over the brake operation using the first brake operation section (11).

8. The vehicle brake system according to claim 4, wherein the controller (7) determines execution of which one of the first wheel cylinder depressurization control and the second wheel cylinder depressurization control is prioritized based on whether a number of the first wheel cylinder (24*a*, 24*c*) is greater than a number of the second wheel cylinder (24*b*).

9. The vehicle brake system according to claim 1, wherein the vehicle (1) is a motorcycle.

10. The vehicle brake system according to claim 9, wherein the one wheel is the front wheel (2).

* * * * *